Oct. 20, 1970 M. HENRY ET AL 3,535,526

INTEGRATED PHOTOSENSITIVE SWITCHING CIRCUIT USING DOUBLE EMITTER TRANSISTORS

Filed March 1, 1968

3 Sheets-Sheet 1

Oct. 20, 1970 M. HENRY ET AL 3,535,526

INTEGRATED PHOTOSENSITIVE SWITCHING CIRCUIT USING DOUBLE EMITTER TRANSISTORS

Filed March 1, 1968 3 Sheets-Sheet 2

3,535,526

INTEGRATED PHOTOSENSITIVE SWITCHING CIRCUIT USING DOUBLE EMITTER TRANSISTORS

Michel Henry and Jacques Lacour, Grenoble, France, assignors to Commissariat a l'Energie Atomique, Paris, France Filed Mar. 1, 1968, Ser. No. 709,772
Claims priority, application Germany, Sept. 6, 1967, 1,549,693
Int. Cl. H01j 39/12
U.S. Cl. 250—209 5 Claims

ABSTRACT OF THE DISCLOSURE

A matrix of phototransistors suitable for use as a retina, classifier, etc. Each transistor has two emitters. One emitter is at a constant potential and a second emitter may be brought either to one or the other of two different potentials so selected that the transistor supplies a current, which is a function of the intensity of light received by its base-emitter junction, to one or the other of its emitters depending upon which one of said two different potentials is applied.

The invention relates to integrated photosensitive circuits and is intended to provide such a circuit whose light-sensitive components are phototransistors, said circuit being suitable for use as a retina or associated to self-organizing circuits and/or incorporated in a pattern recognition machine; such machines are known: they are described for example in the book entitled "Learning Machines" by Nielson.

According to the invention, there is provided a circuit comprising a plurality of cells each including a phototransistor having two emitters, whose collector is brought to a constant potential, whose first emitter is connected to a predetermined electric potential by a load resistor, and whose second emitter may be brought either to the one or to the other of two different potentials representing Boolean values, so selected that said phototransistor supplies a current which is a function of the intensity of light received by its base-emitter junction, to one or the other of its emitters depending upon which one of said two different potentials is applied to the second emitter.

The cells may be associated in a matrix network comprising *m* lines and *n* columns, the first emitters of the phototransistors disposed in a same line *j* of the matrix being connected to a common load resistor, and the second emitters of the phototransistors disposed in a same column *i* being interconnected and brought to the same potential.

In a preferred—but in no way exclusive—embodiment of the invention, all phototransistors of a matrix are made on a common n-type silicon plate constituting the collectors, the bases are constituted with p-type zones diffused in the plate and the emitters are constituted with n-type zones diffused in the bases, the connections between the first emitters of a same line and the second emitters of a same column consisting in metal strip coatings.

The invention will now be described, by way of non-limitative example, with reference to the accompanying drawings in which.

Figure 1:
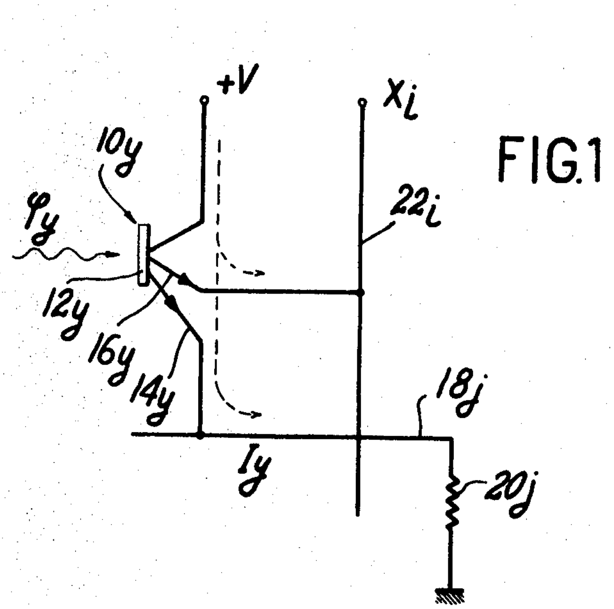
FIG. 1 is a quite schematic diagram of a phototransistor cell according to the invention.

The cell shown in FIG. 1 comprises a phototransistor $\mathbf{10}_{ij}$ having two emitters, whose base is not connected. The collector of transistor $\mathbf{10}_{ij}$ is maintained at a constant potential V by a DC supply (not shown). A first emitter $\mathbf{14}_{ij}$ of transistor $\mathbf{10}_{ij}$ is grounded by a conductor that, in the following description, will be designated as a row conductor $\mathbf{18}_j$, and by a load resistor $\mathbf{20}_j$. The second emitter $\mathbf{16}_{ij}$ is connected to a conductor that, in the following description, will be designated as a column conductor $22_i$ and may be brought to either of two potentials $+v$ and $-v$. Potential V is much higher than $v$, and the values V and $v$ are so selected that the emitter current, substantially proportional to the light flux $\varphi_{ij}$ received by the base-emitter junction of the phototransistor, flows through the emitter $\mathbf{14}_{ij}$ and the row conductor $\mathbf{18}_j$, if the potential of the second emitter $\mathbf{16}_{ij}$ is equal to $+v$. Generally V will have a value of between 2.5 and 4 volts and $v$ will have a value close to 1 volt. If the potential of the second emitter is equal to $-v$, the same emitter current flows through the column conductor $\mathbf{22}_i$. Thus, it may be stated that:

$$I_{ij}=A_{ij}\cdot X_i$$

In this formula:

$I_{ij}$ is the current through the emitter $\mathbf{14}_{ij}$ and the conductor $\mathbf{18}_j$;

$X_i$ is a Boolean (or binary) parameter which is equal to 1 if the potential of emitter $\mathbf{16}_{ij}$ is equal to $+v$, and equal to 0 if said potential is equal to $-v$;

$A_{ij}$ is a positive analog value representing the amount of light received by transistor $\mathbf{10}_{ij}$.

Figure 2:
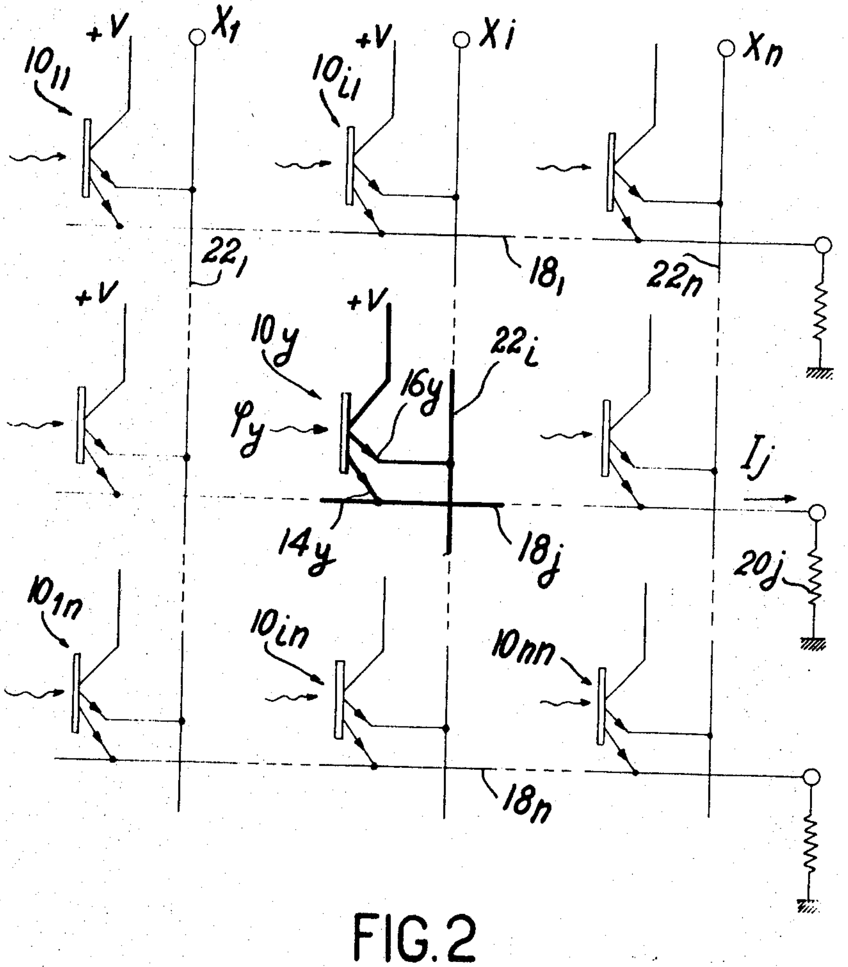
FIG. 2 is a schematic diagram illustrating the main components of a matrix consisting of cells according to FIG. 1.

Referring to FIG. 2, is shown a plurality of cells similar to the cell shown in FIG. 1 connected for constituting a matrix having *m* rows and *n* columns; for more clarity, reference numeral $\mathbf{10}_{ij}$ will be used to designate that transistor which is at the crossing of the *i*th column and of the *j*th row. In the matrix, the total current $I_j$ flowing through resistor $\mathbf{20}_j$ will be:

$$I_j=\sum_{i=1}^{i=n} A_{ij}\cdot x_i$$

In other words, $I_j$ represents the scalar product of an electric vector X (with *n* Boolean components) by the light vector $A_j$ projected on the *j*th row, all components of said vector being analog (as opposed to digital) and positive.

Figure 3:
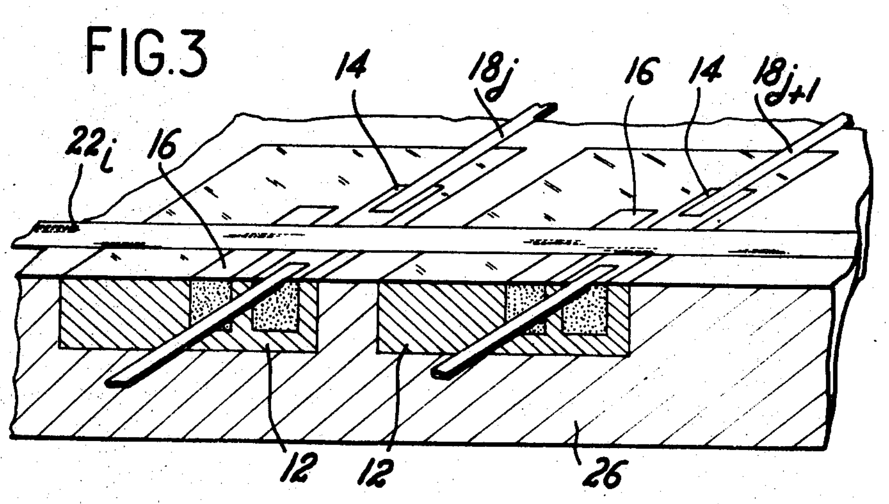
FIG. 3 is a schematic large-scale isometric representation of a portion of an integrated circuit formed on a silicon plate and corresponding to the matrix of FIG. 2.

Such a matrix may be manufactured by several conventional methods. However, it seems preferable to use the process which will now be described with reference to FIG. 3 and which comprises successive coatings by epitaxial growth and use of masks; by using said process, matrices comprising $10\times10=100$ phototransistors have already been manufactured; it is of course possible to interconnect several matrices to increase the number of phototransistors.

A n-type silicon plate having a high electric resistivity is used as a collector common to all phototransistors of the matrix. Bases 12 of the p-type are diffused in the plate by conventional processes using a mask. The mask is replaced and the emitters 14 and 16 of the $n^+$-type conduction (i.e. having an increased content of n-type impurities) are diffused in the bases 12 by using the same process. After the diffusion steps have been carried out, the surface of the plate is coated with an insulating layer of silicon dioxide $SiO_2$. For satisfactory response to light, it is desirable that the $SiO_2$ layer is of substantially constant thickness and is within rather narrow limits depending, to a certain extent, on the nature of the radiations to be detected. For a normal light flux, a thickness of from 5000 to 6000 A. is to be preferred in most cases. Thus, a network having phototransistors spaced apart by a distance of about 250$\mu$ may be obtained.

The row conductors and the column conductors are formed by coating the plate with aluminium in a vacuum and by photoprinting: after the whole surface of the plate has been coated, a mask delimiting a pattern corresponds to the array of conductors is located on the coated plate and that position which is not protected by the mask is removed by exposure to light and processing. The junctions of the conductors with the corresponding emitters are established by reserving holes in the $SiO_2$ layer: this manufacturing process is relatively conventional and need not be described in full detail.

Along the column conductors such as $22_i$ the insulating layer must obviously be retained at the crossings with the first emitters 14. The row conductors such as $18_j$, $18_{j+1}$, . . . (FIG. 3) terminate short of each side of the column conductors for preventing them from being in electric contact. A bridge providing continuity of said row conductors is formed in depth by the emitters 14.

One of the technologic advantages of the invention, in the case of a matrix, appears from the preceding description: it is not necessary to provide an insulating sheath separating the transistors.

The amount of light received by every cell (which determines the value of the parameters $A_{ij}$) may be controlled in a variety of ways: For instance, a light source may be provided which illuminates evenly the surface of the matrix and:

(a) A filter screen whose transparency at each point is proportional to the value of the parameter $A_{ij}$ to be associated with the transistor at the corresponding point of the matrix is located between the source and matrix, or (b) An opaque screen having openings for exposure of photosensitive surfaces of the matrix which are proportional to the values of $A_{ij}$ may be located between the source and matrix.

The screen may be a microphotography carried by a layer of optical fibers which is bonded on the matrix, or an aluminum layer of variable thickness coated on the matrix.

Matrices of the type illustrated in FIG. 2 are suitable for numerous uses, inter alia: Classifiers of pattern recognition machines, retinae, particularly for such machines, and threshold logic circuits.

For more clarity the basic constitution of a pattern recognition machine of the learning or self-adapting type will first be considered. More complete descriptions of the basic features of such machines may be found in numerous publications, for instance in "Computer and Information Sciences" (Spartan Books, Washington, D.C., 1964). Particular reference may be had to the paper entitled "Determination and Detection of Features in Patterns" in pages 75–110.

Figure 4:
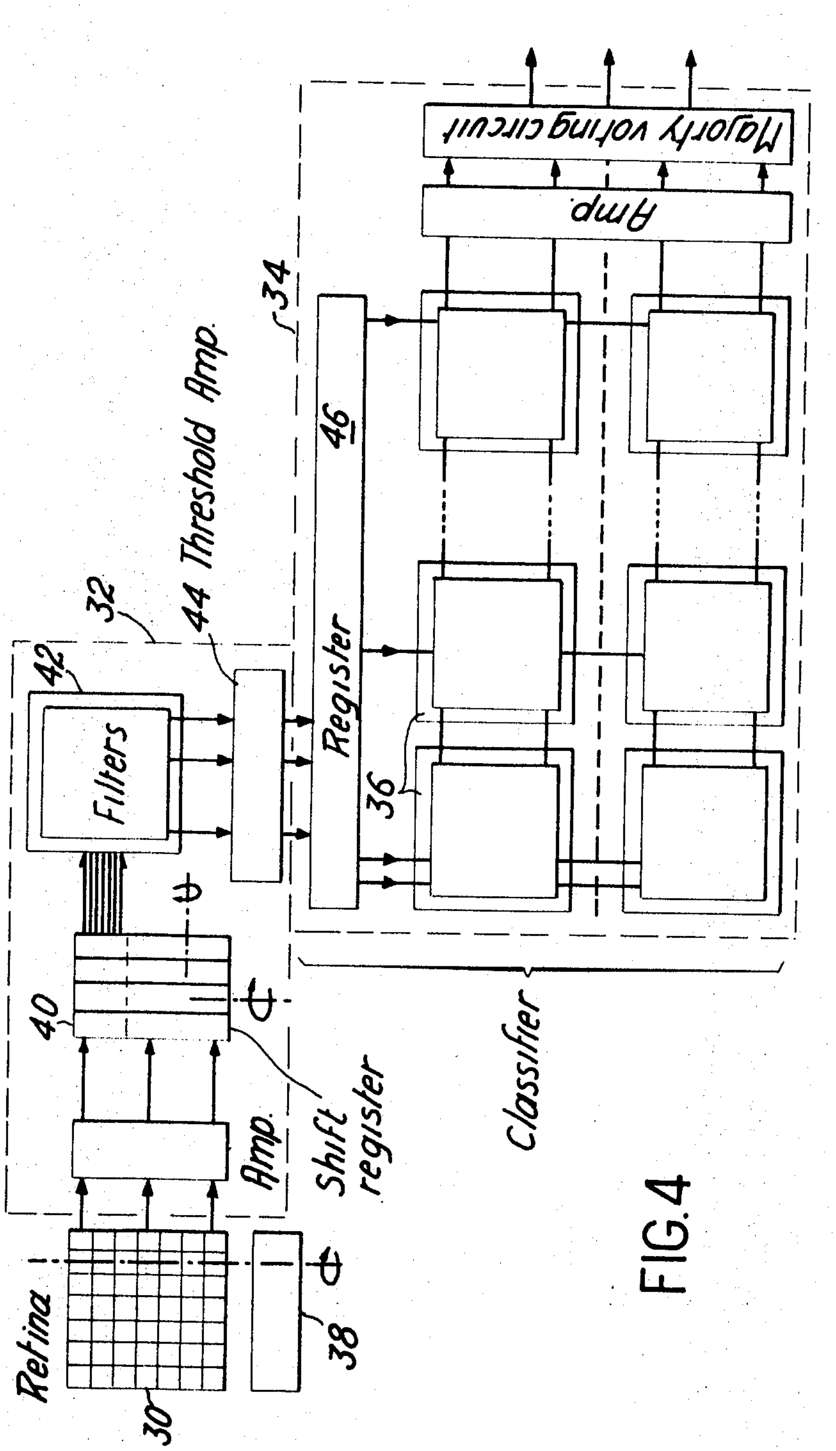
FIG. 4 is a block diagram schematically illustrating the main components of a pattern recognition machine incorporating the invention.

Referring now to FIG. 4, there is shown a block diagram illustrating the main components of a pattern recognition machine (those components which are used during the learning procedure being omitted). The machine comprises a retina 30 on which the image to be recognized is projected by an optical system (not shown) the digital outputs from the retina are applied to an encoder 32 adapted to detect significant features or "graphemes" and to deliver corresponding signals representative of their presence to a classifier 34 having several filters 36 each corresponding to one of the patterns to be recognized.

According to the invention, the retina may consist in a matrix according to FIG. 2 associated with a control system 38 for sequential scanning of the columns. A first series of voltage values $+v, -v, \ldots, -v \ldots, -v$ is applied on the column conductors $22_1$, $22_2$, . . . , $22_i$, . . . , $22_n$ so that the currents on the line conductors correspond to phototransistors $10_{11}$, . . . , $10_{1j}$, . . . , $10_{1m}$ only (phototransistors of the first column). The same operation is repeated $(n-1)$ times with voltage $+v$ being applied to one different column each time. In other words, each Boolean component of the electric vector X is given the value 1 in seriatim order, while the other components are given a zero value.

The encoder includes a buffer shift register 40 associated with filters 42 each corresponding to a particular grapheme and with differential threshold amplifiers 44 whose outputs are connected to the input register 46 of the classifier 34. The filters may consist in lines of another matrix of the type shown in FIG. 2.

The "weight" of the Boolean operators may be adjusted by an adaptative or learning process of the type described in French Patent No. 1,494,146 of Commissariat ā l'Energie Atomique.

The shift register sequentially applies to the filters signals from groups of cells for detection of significant "features" or "graphemes." The presence of such features results in transmission of corresponding digital signals to register 46. The filters 36 of classifier 34 are similar to those of the encoder.

By way of example, it may be indicated that a machine for recognition of printed characters may include a retina of sixty-four phototransistor cells (8×8), divided in nine portions of sixteen phototransistor cells, each offset by two cells from the next portions. The shift register 40 has eight positions and four columns. The register sequentially presents all portions to a matrix having sixteen columns and seven rows with each row constituting a filter whose characteristics are set by a screen of the type mentioned above. The presence of graphemes such as horizontal or vertical lines longer than three cells, oblique lines, crossings, result in decision signals which are entered into register 46 having sixty three positions (7×9). The register is connected to the filters 36 of the classifier, comprising several rows each having seven matrices; each row makes it possible to sort out ten categories of patterns.

What we claim is:

1. An integrated photosensitive circuit whose light-sensitive components are phototransistors, comprising a plurality of cells each including a phototransistor having a collector and first and second emitters, means for bringing said collector to a constant potential, a load resistor connecting said first emitter to a predetermined electric potential and means for bringing said second emitter either to the one or to the other of two different potentials representing Boolean values, so selected that said phototransistor supplies a current which is a function of the intensity of light received by its base-emitter junction to one or the other of its emitters depending upon which one of said two different potentials is applied to the second emitter.

2. A circuit according to claim 1, wherein said cells are associated in a matrix, the first emitters of those phototransistors which are in a same row of the matrix are connected to a common load resistor, and the second emitters of those phototransistors which are disposed in a same column of the matrix are interconnected at the same potential.

3. A circuit according to claim 2, wherein each of said phototransistors comprises on a common silicon plate of n-type conduction constituting a collector common to all transistors, p-type diffused zones constituting the base and two $n^+$-type zones diffused in the base, and constituting the emitters, and wherein the connections between the first emitters of a same row and the second emitters of a same column consist in strips of metal coatings located in two directions at right angles.

4. In a pattern recognition machine, a retina comprising a circuit according to claim 1 including column conductors connected to the second emitters of those phototransistors which are disposed in a same column and a device for switching said column conductors, one at a time in seriatim order, from said one potential to said other potential.

5. In a pattern recognition machine, a classifier comprising a circuit according to claim 1, a light source and a screen between said source and circuit providing adjustable illumination of each cell.

References Cited

UNITED STATES PATENTS

| | | | |
|---|---|---|---|
| 2,702,838 | 2/1955 | Haynes. | |
| 2,867,733 | 1/1959 | Hunter. | |

| | | | |
|---|---|---|---|
| 2,913,704 | 11/1959 | Huang. | |
| 3,191,040 | 6/1965 | Critchlow. | |
| 3,248,552 | 4/1966 | Bryan | 340—146.3 |
| 3,304,431 | 2/1967 | Biard e tal. | |

ARCHIE R. BORCHELT, Primary Examiner

C. M. LEEDOM, Assistant Examiner

U.S. Cl. X.R.

250—211, 220; 307—299, 311; 317—235.413, 235.27; 340—146.3